March 18, 1947.　　A. C. TEN CATE ET AL　　2,417,528
PRESELECTING MECHANISM
Filed May 29, 1945　　3 Sheets-Sheet 1
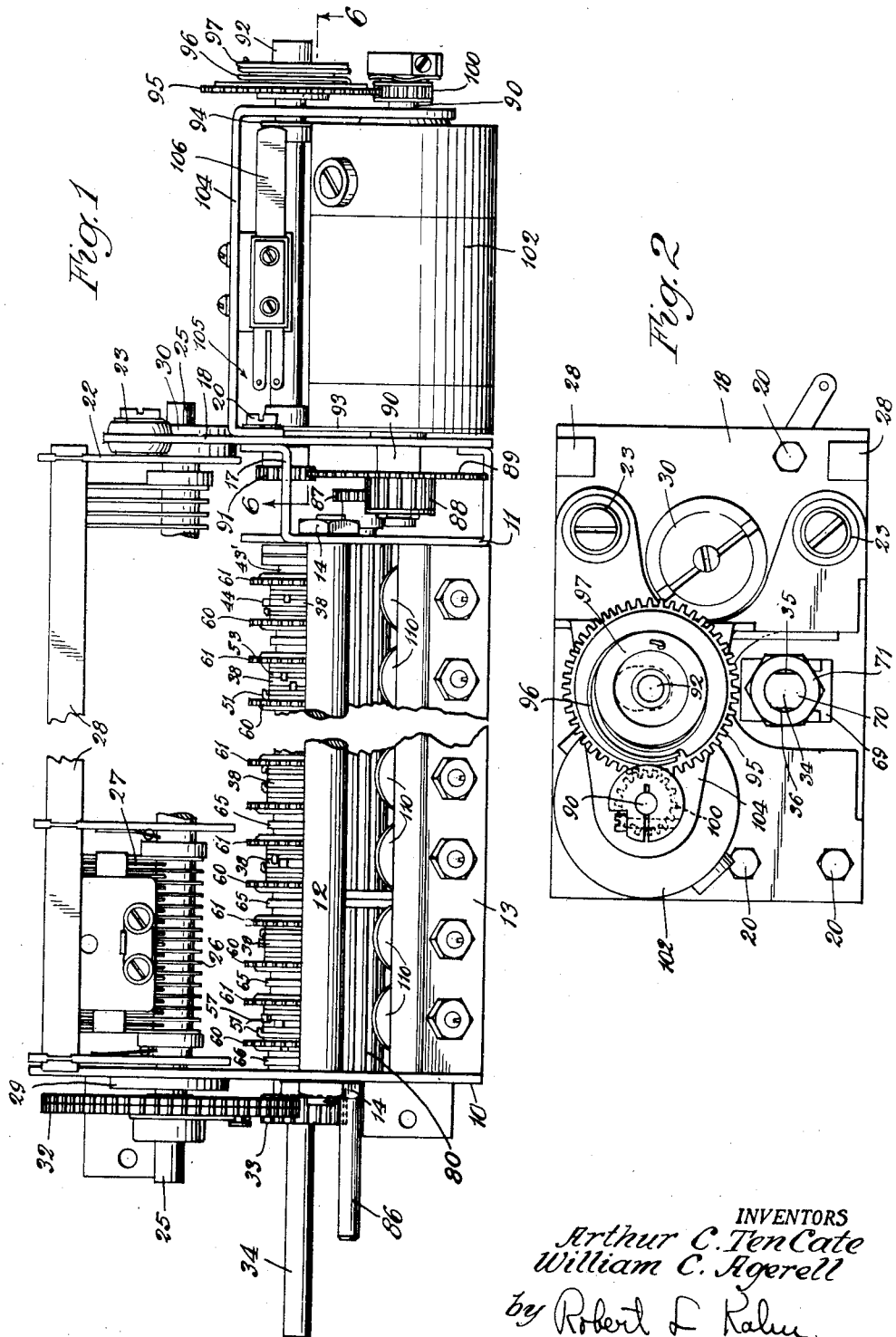
INVENTORS
Arthur C. Ten Cate
William C. Agerell
by Robert L. Kahn
Attorney INVENTORS.
Arthur C. Ten Cate
William C. Agerell
by Robert L. Kahn
Attorney March 18, 1947.                A. C. TEN CATE ET AL                2,417,528
                                PRESELECTING MECHANISM
                              Filed May 29, 1945         3 Sheets-Sheet 3
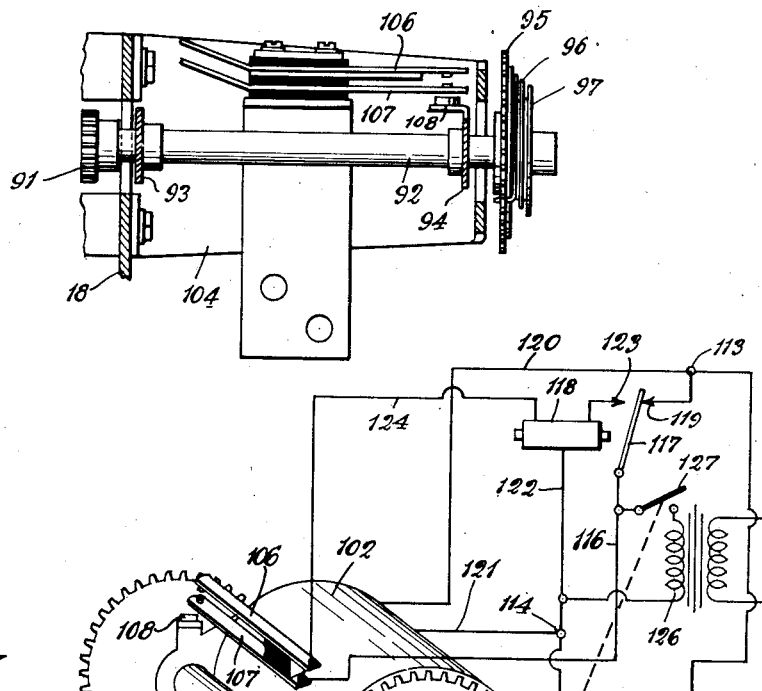
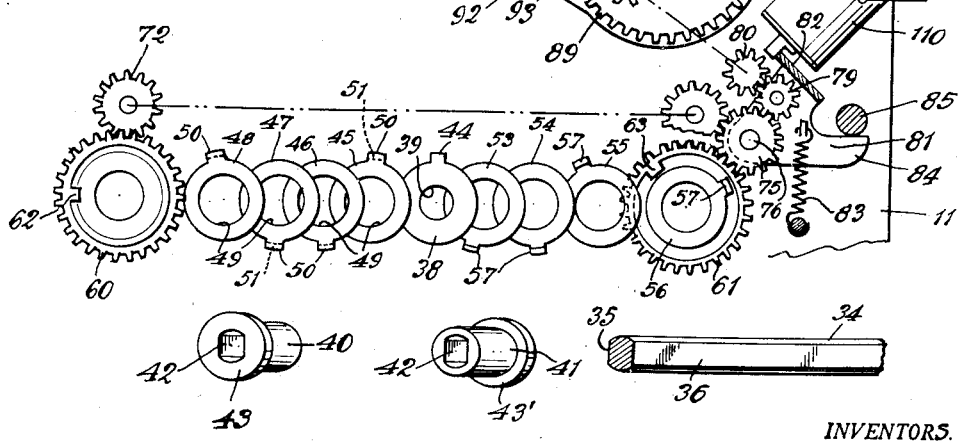
INVENTORS.
Arthur C. Ten Cate
William C. Agerell
by Robert L. Kahn
   Attorney Patented Mar. 18, 1947

2,417,528

UNITED STATES PATENT OFFICE 2,417,528

PRESELECTING MECHANISM

Arthur C. Ten Cate and William C. Agerell, Chicago, Ill., assignors to Oak Mfg. Co., Chicago, Ill., a corporation of Illinois Application May 29, 1945, Serial No. 596,482

5 Claims. (Cl. 192—142)

This invention relates to a preselecting mechanism and is an improvement upon the invention disclosed in Patent 2,293,299, granted August 18, 1942. In this patent, there is disclosed a motor driven preselecting mechanism wherein oppositely driven movements are provided between a source of power, such as a motor, and a device to be indexed, such as a condenser. The oppositely driven movements locate the final index position by applying equal and opposite indexing forces. At the time when such forces are equal and opposite, the source of power, such as the motor, functions merely as a torque source. In the case of a motor, continued rotation is no longer possible, since stalling is the normal condition after indexing.

Inasmuch as the actual indexing occurs intermittently, it is customary to provide a motor which is overloaded for a short period of time during preselection. As a rule and depending upon the frequency of preselection, overloads of the order of 1000% and more may be imposed upon the motor. By virtue of this, small size and light motors may be used.

It is clear, therefore, that motors operating under such conditions of overload should be energized only during preselection and promptly deenergized upon the end of a preselecting cycle. The invention hereinafter described provides a simple and effective means whereby the stalling of the motor is utilized for deenergizing the motor circuit.

Figure 3:
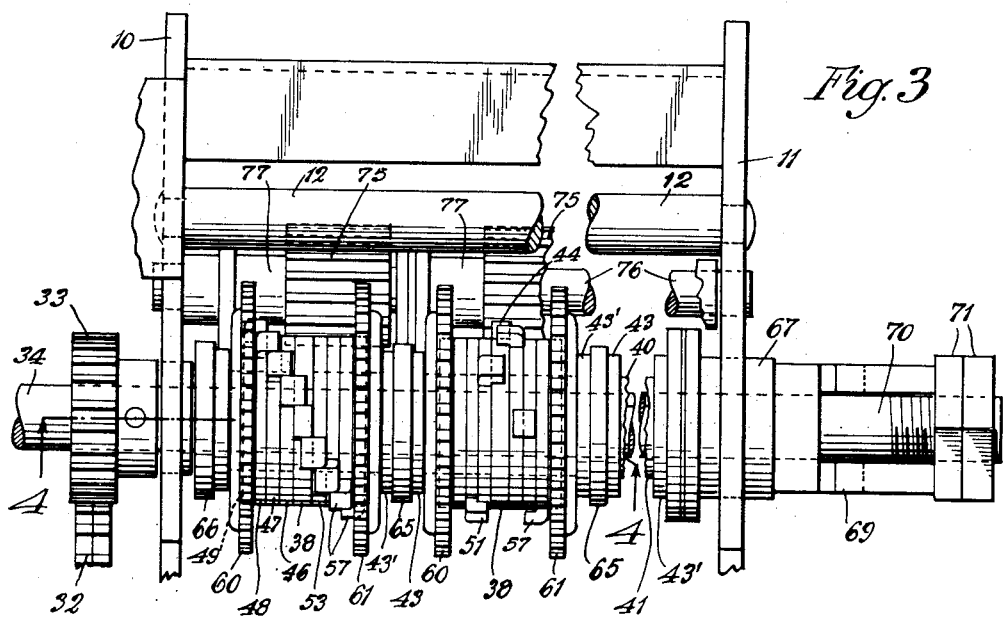
Figures 4, 5:
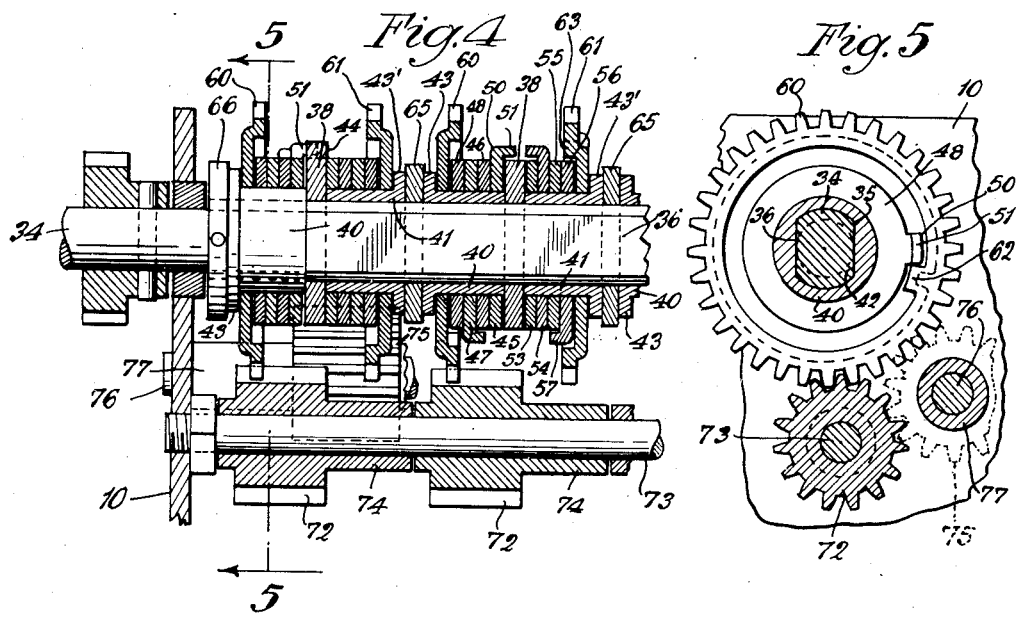

In order to explain the invention more fully, reference will now be made to the drawings wherein Figure 1 is a side elevation of a mechanical system embodying the invention. Figure 2 is an end view on 2—2 of Figure 1. Figure 3 is an enlarged detail showing two preselector units. Figure 4 is a section on 4—4 of Figure 3. Figure 5 is a section on 5—5 of Figure 4. Figure 6 is a sectional detail on 6—6 of Figure 1, and Figure 7 is an exploded view, partly diagrammatic, illustrating one preselector unit and showing the motor and electrical circuit.

End plates 10 and 11 may have spacer rods 12 (only one is visible in Figure 1) and angle iron 13 to form a skeleton frame work for supporting the entire mechanism. Rods 12 may be maintained in position by having threaded ends passing through suitable apertures in end plates 10 and 11 and having nuts 14 retain the assembly rigidly in position. Angle iron 13 may be rigidly joined to end plates 10 and 11 in any suitable fashion.

End plate 11 has off-set portion 17 carrying motor supporting plate 18. Motor supporting plate 18 may be secured to off-set 17 in any desired fashion, such as by bolts 20. Motor supporting plate 18 supports end plate 22 in resilient mounting 23. Mounting 23 may consist of a bolt and rubber or other flexible washer for supporting plate 22 on plate 23 in a vibration-free manner.

End plate 22 cooperates with end plate 10 for supporting a load having shaft 25 to be turned to any one of a number of preselected angular positions. Shaft 25 may carry any desired device to be turned and, as shown here, forms a shaft of a variable condenser group. Thus, shaft 25 may carry condenser rotor 26 interleaved with stator 27 carried by frame rods 28 rigidly secured between plates 10 and 22. It is clear that the vibration-free mounting by which end plate 22 is supported is required only because the load happens to be a variable condenser. If described, the vibration-free mounting may be omitted.

Load shaft 25 may be journaled in plates 10 and 22 in any suitable fashion. Thus, plate 10 may have journal 29 rigidly supported thereby and in which shaft 25 may turn. Plate 22 may have journal 30 formed therein for supporting the other end of shaft 25. Journal 30 is preferably of the type having means for adjusting the end play on shaft 25 and also for applying any desired amount of friction. Inasmuch as journals 29 and 30 are of the usual type used in such devices, no detailed description thereof is deemed necessary.

Load shaft 25 carries gears 32 rigidly locked thereon for driving purposes. Gears 32 are two separate similar gears having a spring connection tending to eliminate backlash. This type of gear is well known in the art and is used quite frequently in condenser drives for precision.

Load gear 32 meshes with gear 33 on preselecting shaft 34. Preselecting shaft 34 has its angular position preselected by the mechanism and, by virtue of its position, serves to adjust load shaft 25 to the final preselected position. 34 may be combined with shaft 25 if desired, and the load applied directly to shaft 34. For purposes of compactness, however, it is preferred to separate preselecting shaft 34 and load shaft 25 and have a drive between them.

Preselecting shaft 34 is journaled in end plates 10 and 11. This shaft carries a plurality of units which, together with remaining apparatus, constitute a plurality of preselector units. Inasmuch as the units are similar, one complete unit shown in exploded form in Figure 7 will be described in detail.

Shaft 34 has a pair of oppositely disposed flats 35 and 36 ground or formed thereon and extending throughout its effective length. At the center of each preselector section is washer 38 rotatively mounted on shaft 34. Washer 38 is provided with aperture 39 just clearing the normal uncut circular section of shaft 34. On opposite sides of washer 38 are clamping sleeves 40 and 41 having bores 42 shaped to correspond with the mutilated section of shaft 34. Thus, sleeves 40 and 41 may slide longitudinally of the shaft but are rotatably locked. Each sleeve has an end flange 43. For precision in preselection, it is necessary that sleeves 40 and 41 be accurately shaped so that no rotary movement with respect to shaft 34 is possible. By forcing sleeves 40 and 41 against the opposite sides of washer 38, it is possible to lock washer 38 in any desired rotary position with respect to shaft 34.

Washer 38 is provided with finger 44 against which the driving movements exert the forces necessary for operation of the device. In order to increase the angular range of operation of the device, a plurality of rings 45 to 48 inclusive may be provided. As shown here, four rings are provided. The number, however, may be increased or decreased as the case may be. Rings 45 to 48 inclusive have apertures 49 sufficiently large to ride on the outside of sleeve 40. Each of the rings is provided with driving finger 50 having tip 51 bent out of the plane of the driving ring. When the driving rings are disposed adjacent each other, each tip 51 overlies the adjacent ring toward center washer 38. Thus, each driving ring may make almost a complete turn freely and then serves to drive the next succeeding ring. Driving ring 45 has its finger 50 adapted to engage finger 44 of washer 38 to drive shaft 34.

Center washer 38 has driving rings 53 to 56 inclusive on the other side (the right-hand side as seen in Figure 7) with each driving ring being provided with finger 57. These driving rings are similar to driving rings 45 to 48 with fingers 56 pointing toward washer 38. Driving rings 53 to 56 inclusive are mounted on sleeve 41 to rotate thereon.

It is clear that, if each group of driving rings is driven at equal and opposite speeds, center washer 38 will be moved to a certain position. This certain position will be reached when finger 44 of washer 38 is urged equally and in opposite directions by the fingers of driving rings 45 and 53. The exact position of shaft 34 may be determined by relative adjustment of the shaft and washer 38.

Driving rings 45 to 48 inclusive and 53 to 56 inclusive cooperate with driving gears 60 and 61 respectively. These gears are provided with fingers 62 and 63 extending laterally toward center washer 38. Rings 45 to 48 inclusive and gear 60 are rotatably disposed upon clamping sleeve 40 with flange 43 retaining the assembly thereon. Similarly, rings 53 to 56 inclusive and gear 61 are rotatably disposed upon clamping sleeve 41 with flange 43' thereof retaining that assembly thereon. Between adjacent preselector units, as shown in Figures 3 and 4 for example, spacing washers 65 may be disposed between opposed end flanges 43 and 43' of the clamping sleeves.

The complete system of sleeves and spacer washers 65 may be disposed between fixed collar 66 pinned or rigidly fastened to shaft 34 and a means for exerting an end thrust at the other end of the shaft. This means may include sleeve 67 rotatably mounted in end plate 11, said sleeve having flange 68 for preventing loss of sleeve 67.

Sleeve 67 may have spacing member 69 extending to threaded portion 70 of shaft 34 with nuts 71 disposed over said threaded portion. By adjusting nuts 71, pressure on sleeve 67 along the shaft may be either exerted or relaxed. Thus central washers 38 may be tightened in predetermined position. A desirable means for controlling the pressure along the shaft against the various sleeve assemblies is disclosed and claimed in Patent 2,179,748. The washer assembly for a preselector unit is disclosed and claimed in Patent 2,161,183.

Gear 60 of each preselector section meshes with pinion 72 freely rotatable upon rod 73 rigidly disposed between end plates 10 and 11. Each pinion 72 has reduced portion 74 for clearing gear 61. The various pinions 72 are so proportioned in length as to prevent excessive end play along rod 73. Otherwise, their adjustment is not critical.

Gear 61 meshes with pinion 75 freely rotatable on rod 76 rigidly mounted between end plates 10 and 11. Pinions 75 have reduced portion 77 for clearing gears 60 and are mates to pinions 72.

As is clearly evident in Figure 4, a pair of pinions 72 and 75 for one preselector unit are displaced axially, the pinions themselves being wide enough and rods 73 and 76 being so disposed as to cause these two to mesh with each other. Each preselector section has one movable pinion 79 which is adapted to simultaneously engage drive gear 80 and one of gears 72 or 75, in this particular instance gear 75. Pinion 79 is carried on armature bracket 81 rotatably mounted on rod 76 between adjacent pinions 75. Armature bracket 81 has armature portion 82. Bracket 81 is normally biased downwardly as seen in Figure 7 by spring 83 so that pinion 79 is normally out of engagement with drive gear 80. The body of bracket 81 may have wing portion 84 cooperating with rod 85 disposed between end plates 10 and 11 and serving to limit the movement of said bracket for engaging pinion 79 and drive gear 80.

Drive gear 80 extends the entire distance between end plates 10 and 11 and has shaft portions 86 journaled in end plates 10 and 11 for rotatably supporting the gear. Drive gear 80 may be driven through gear 87 carried on one of the shaft portions, in this instance just beyond mounting plate 11, and meshes with pinion 88. Pinion 88 is rigidly connected to gear 89, the two being concentric and rotatably mounted upon shaft 90. It is understood that pinion 88 and gear 89 operate as a unit but may freely rotate on motor shaft 90.

Gear 89, in turn, meshes with pinion 91 carried by jackshaft 92 journaled in motor end plates 93 and 94. Jackshaft 92 carries gear 95 at the end adjacent plate 94 and this gear. Gear 95 is connected to shaft 92 through coil spring 96, one end of coil spring 96 being locked to gear 95, while the other end is locked to washer 97 rigidly mounted upon shaft 92. Thus, gear 95 has a spring connection to shaft 92 permitting limited relative rotary movement therebetween.

Gear 95 meshes with pinion 100 mounted upon shaft 90. Shaft 90 forms part of motor 102 having end plates 93 and 94.

Rigidly carried from mounting plate 18 is a generally U shaped frame 104 having suitable clearances 105 through which jackshaft 92 may project. Frame 104 carries switch contacts 106 and 107, these contacts being normally open but being adapted to be closed by finger 108 carried by jackshaft 92 and adapted to be moved upwardly, as seen in Figure 7, upon movement of said jackshaft.

As has been pointed out before, each preselector section has movable gear 79 mounted upon rotatable armature bracket 81. In order to move gear 79 into meshing engagement with drive gear 80, each preselector unit is provided with electromagnet 110 having pole piece 111 adapted to cooperate with armature portion 82. The series of electromagnets may be bolted on angle iron 13 as shown, this angle iron providing a desirable magnetic circuit for each electromagnet. Each electromagnet 110 is connected by wires 111 and 112 to terminals 113 and 114 respectively. Wire 112 may have switch 115 therein, this switch being one of a bank of switches, one for each preselector. Switch 115 may be any type desired, either manual or automatic. Switch contact 107 is connected by lead 116 to movable contact 117 of relay 118. Movable contact 117 is normally biased against fixed contact 119 connected through terminal 113 and lead 120 to motor 102. Motor 102 has its other terminal connected by lead 121 to terminal 114. Relay 118 has two windings having one connection in common at lead 122 and going down to terminal 114. One winding of relay 118 is connected to off-normal relay contact 123, while the other winding is connected by lead 124 to switch contact 106. A source of power, such as transformer secondary 126, is connected between leads 116 and 122 through switch 127, mechanically tied to switch 115 to open and close together.

In the normal running position of the motor, spring blade 107 is stiff enough and the load on the gear drive is light enough so that finger 108 may contact spring blade 107 but is prevented from closing the switch. Thus, gravity or spring blade 107 may be considered as biasing the stator under normal running conditions to one end position. When the motor stalls, due to the mechanism reaching home position, the load becomes so great and the reaction between gears becomes sufficient to move the stator from its bias position to a position where switch contacts 106 and 107 are closed.

The relay, motor and electromagnet may be operated either by direct or alternating current. Relay 118 has its two windings so disposed as to aid each other, as shown by the arrows.

The operation of the electrical portion of the system is as follows. Assume that switches 115 and 127 are closed. Electromagnet 110 will thereupon be energized, and draw up movable pinion 79 into engagement with drive gear 80. At the same time, motor 102 will be energized through the normal position of relay 118, as shown in Figure 7. When a preselection point has been reached by the mechanism, motor 102 will stall.

The reaction to stalling will cause end plates 93 and 94 to move upwardly, as seen in Figure 7, it being understood that the motor normally rotates its shaft in a counter-clockwise direction, as seen in Figure 7. The clockwise movement of the motor frame, due to the stalling and consequent movement of end plates 93 and 94, will move jackshaft 92 upwardly around the motor shaft, as seen in Figure 7. Since this shaft is parallel to the motor shaft and by virtue of the gear relationships, the motor drive will not be disturbed. However, the reaction of the motor frame will result in switch contacts 106 and 107 closing. The closure of these two contacts completes a circuit through the left winding of relay 118 and results in movable contact 117 being drawn up against fixed contact 123. In this position, the right winding of relay 118 has its circuit completed, so that relay 118 will hold movable contact 117 in position independently of the other winding. When movable contact 117 is drawn against fixed contact 123, the power circuit to motor 102 is broken. When this occurs, the motor assumes its normal position, its return being facilitated by the spring of contact 107. Other means of biasing the motor frame may be provided, however. At the same time, the circuit through electromagnet 110 is also interrupted so that this will not overheat. The only circuit remaining will be through right winding of relay 118, and this will remain energized so long as switches 115 and 127 are closed. This relay may be designed for continuous duty as a safety precaution.

It will be evident from Figures 1, 2 and 7 that the motor shaft has a step-down gear ratio to jackshaft 92, and this, in turn, has a further step-down ratio to gear 89. By virtue of this gear step-down ratio, the torque available for swinging the motor frame when the motor stalls is greatly increased. This is particularly important in that power requirements for the motor thus become reduced. In practice, it has been found that a low power motor may be used, the power developed therefrom being sufficient to drive the preselector mechanism and, at the same time, to accomplish motor frame movement.

It is understood that the preselector units in Patent 2,293,299 may be used instead of the multi-washer assembly as shown in Figure 7. Since the stalling effect of the motor is desired, the precise details of the preselector may vary.

What is claimed is:

1. A preselector comprising a member having a predetermined range of movement and adapted to be indexed to a preselected position in said range, lost motion means adapted to move at equal speeds in opposite directions for moving said member, an electric motor for driving said two means, said motor having a stator and rotor and being adapted to stall when said member has reached a preselected position whereupon said two means will exert equal opposing forces on said member, a speed reducing gear drive from said motor rotor to said two means, said gear drive including a jackshaft parallel to said motor shaft with said jackshaft being geared down, means for supporting said jackshaft from the stator of said motor, means for mounting said stator so that it has limited rotary movement, means for biasing said stator to one end position, a control circuit for said motor, said circuit including a switch, and means for coupling said switch to said stator whereby when said motor stalls reaction causes said stator to move through a limited arc away from its biased position and operate said switch to open said motor circuit.

2. The system of claim 1 wherein said member is rotatable with the range of movement being angular.

3. A preselector comprising a rotary member having a predetermined range of angular movement and adapted to be indexed to a preselected angular position in said range, lost motion means adapted to rotate at equal speeds in opposite directions for rotating said member, an electric motor having a stator and rotor for driving said two means, said motor being adapted to stall when said member has reached its preselected position whereupon said two means will exert equal opposing forces on said member, a speed reducing gear drive from said motor rotor to said two means, said gear drive including a jackshaft laterally displaced from and parallel to said rotor axis and geared down, means for supporting said jackshaft from the stator of said motor, means for mounting said stator so that it has limited rotary movement around the rotor, means for biasing said stator to one end position, a supply circuit for said motor, said circuit including a switch, and means for coupling said switch to said stator whereby when said motor stalls reaction causes said stator to move away from its biased position through a limited arc and operate said switch to open the motor circuit, said rotor having a step-up gear ratio to said jackshaft permitting a motor of low power to be used.

4. The structure of claim 3 wherein said jackshaft has gears adjacent both motor ends, and wherein gears meshing with said jackshaft gears are coaxial with said motor.

5. A preselector comprising a rotary member having a predetermined range of angular movement and adapted to be indexed to a preselected angular position in said range, lost motion means adapted to rotate at equal speeds in opposite directions for rotating said member, an electric motor having a stator and rotor for driving said two means, a speed reducing gear train between said motor and said two means, said train including one gear movable in and out of meshing engagement to connect said motor and lost motion means, said motor being adapted to stall when said member has reached its preselected position whereupon said two means will exert equal opposing forces on said member, said gear train including a jackshaft laterally displaced from and parallel to said rotor axis and geared down with respect to said rotor axis, means for supporting said jackshaft from the stator of said motor, means for mounting said stator so that it has limited rotary movement around the rotor, means for biasing said stator to one end position, electromagnetic means for controlling said movable gear, said movable gear being normally out of mesh to disengage said motor from said lost motion means but being adapted to go into meshing engagement upon energization of said electromagnetic means, a supply circuit for said electromagnetic means and motor, said circuit including a control switch, means for coupling said control switch to said stator, said stator being adapted to react upon motor stalling to move said stator away from its biased position, said stator being adapted to operate said switch upon such stator movement for opening said motor and electromagnetic control circuits.

ARTHUR C. TEN CATE.
WILLIAM C. AGERELL.

REFERENCES CITED

The following references are of record in the file of this patent:

UNITED STATES PATENTS

| Number | Name | Date |
| --- | --- | --- |
| 2,161,133 | Mastney | June 6, 1939 |
| 2,246,050 | Leishman | June 17, 1941 |